United States Patent
Jiang

(10) Patent No.: US 9,319,885 B2
(45) Date of Patent: Apr. 19, 2016

(54) METHOD FOR DYNAMICALLY SETTING VIRTUAL SUBCARRIERS, RECEIVING METHOD, APPARATUS AND SYSTEM

(71) Applicant: Huawei Technologies Co., Ltd., Shenzhen (CN)

(72) Inventor: Wei Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/555,780

(22) Filed: Nov. 28, 2014

(65) Prior Publication Data

US 2015/0124896 A1 May 7, 2015

Related U.S. Application Data

(63) Continuation of application No. PCT/CN2012/083754, filed on Oct. 30, 2012.

(30) Foreign Application Priority Data

May 28, 2012 (CN) .......................... 2012 1 0167944

(51) Int. Cl.
H04K 1/10 (2006.01)
H04W 16/10 (2009.01)
(Continued)

(52) U.S. Cl.
CPC ........... *H04W 16/10* (2013.01); *H04L 27/2627* (2013.01); *H04L 27/0006* (2013.01)

(58) Field of Classification Search
CPC .................................................. H04W 16/10
USPC ......................................................... 375/260
See application file for complete search history.

(56) References Cited

U.S. PATENT DOCUMENTS

| 7,986,738 B2 | 7/2011 | Sankabathula et al. |
| 2009/0274035 A1 | 11/2009 | Siaud et al. |

(Continued)

FOREIGN PATENT DOCUMENTS

| CN | 1714525 A | 12/2005 |
| CN | 1816027 A | 8/2006 |

(Continued)

OTHER PUBLICATIONS

Li et al., "A Low-Complex Virtual Sub-Carrier Reservation Algorithm for PAPR Reduction," 5th International Conference on Wireless Communications, Networking and Mobile Computing, pp. 1-4, Institute of Electrical and Electronics Engineers, New York, New York (Sep. 24-26, 2009).

(Continued)

*Primary Examiner* — Lihong Yu
(74) *Attorney, Agent, or Firm* — Leydig, Voit, Mayer, Ltd.

(57) ABSTRACT

A method for dynamically setting virtual subcarriers includes: acquiring, by a transmitter, dynamic spectrum information of a geographic location where the transmitter is located; determining the number of the left edge virtual subcarriers and the number of the right edge virtual subcarriers of the multicarrier transmission system, according to the dynamic spectrum information, at the left and right edges of a working spectrum of the transmitter, to make a sum of the number of the left edge virtual subcarriers and the number of the right edge virtual subcarriers be not less than an aliasing guard band of a baseband signal of the multicarrier transmission system, and be not greater than a dimension of discrete Fourier transform of the baseband signal; and setting virtual subcarriers of the multicarrier transmission system according to the number of the left edge virtual subcarrier and the number of the right edge virtual subcarriers determined.

12 Claims, 7 Drawing Sheets

(51) Int. Cl.
  *H04L 27/26* (2006.01)
  *H04L 27/00* (2006.01)

(56) References Cited

U.S. PATENT DOCUMENTS

| | | | |
|---|---|---|---|
| 2010/0002571 A1* | 1/2010 | Liao et al. | 370/208 |
| 2010/0008217 A1 | 1/2010 | Ding et al. | |
| 2010/0128807 A1* | 5/2010 | Hyung-Jin et al. | 375/260 |
| 2012/0275354 A1* | 11/2012 | Villain | 370/281 |

FOREIGN PATENT DOCUMENTS

| | | |
|---|---|---|
| CN | 101336534 A | 12/2008 |
| CN | 101378371 A | 3/2009 |
| CN | 101385271 A | 3/2009 |
| CN | 102100047 A | 6/2011 |
| CN | 102143099 A | 8/2011 |
| EP | 1566907 A1 | 8/2005 |

OTHER PUBLICATIONS

Jia et al., "Coexistence of OFDM-Based WLANs by Virtual Subcarrier Assignment (VISA) with Multiple Subcarrier Puncturing," 2004 IEEE 60$^{th}$ Vehicular Technology Conference, pp. 4330-4334, vol. 6, Institute of Electrical and Electronics Engineers, New York, New York (Sep. 26-29, 2004).

Morelli et al., "A Comparison of Pilot-Aided Channel Estimation Methods for OFDM Systems," IEEE Transactions on Signal Processing, vol. 49, No. 12, pp. 3065-3073, Institute of Electrical and Electronics Engineers, New York, New York (Dec. 2001).

Rajbanshi et al., "Peak-to-Average Power Ratio Analysis for NC-OFDM Transmissions," 2007 IEEE 66$^{th}$ Vehicular Technology Conference, pp. 1351-1355, Institute of Electrical and Electronics Engineers, New York, New York (Sep. 30-Oct. 3, 2007).

Ahmed et al., "Dynamic null-data subcarrier switching for OFDM PAPR reduction with low computational overhead," Electronics Letters, vol. 48, Issue 9, pp. 498-499, Institution of Engineering and Technology, Stevenage, United Kingdom (Apr. 26, 2012).

Huang et al., "Pilot Design for MIMO OFDM Systems with Virtual Carriers," IEEE Transactions on Signal Processing, pp. 2024-2029, Institute of Electrical and Electronics Engineers, New York, New York (May 2009).

Xu et al., "WPAN technology and its application," (May 2009).

* cited by examiner

METHOD FOR DYNAMICALLY SETTING VIRTUAL SUBCARRIERS, RECEIVING METHOD, APPARATUS AND SYSTEM

CROSS-REFERENCE TO RELATED APPLICATIONS

This application is a continuation of International Patent Application No. PCT/CN2012/083754, filed on Oct. 30, 2012, which claims priority to Chinese Patent Application No. 201210167944.9, filed on May 28, 2012, both of which are hereby incorporated by reference in their entireties.

TECHNICAL FIELD

The present invention relates to the field of communication technologies, and more particularly to a method for dynamically setting virtual subcarriers, a receiving method, an apparatus and a system.

BACKGROUND

A multicarrier transmission system can effectively suppress multipath fading, and achieves high-speed data transmission, in addition, the implementation is simple and spectrum efficiency is high. For example, an orthogonal frequency-division multiplexing (Orthogonal frequency-division multiplexing, abbreviated as OFDM) technology. In a multicarrier system, a frequency selective fading channel is divided into several flat fading subcarriers orthogonal to each other; a spectrum adaptive function can be achieved by simply setting some subcarriers to be zero according to a dynamic change of the spectrum to make these subcarriers not transmit data, and therefore, multicarrier transmission has become the most promising physical layer transmission technology in dynamic spectrum sharing (dynamic spectrum sharing, abbreviated as DSS) and cognitive radio (Cognitive Radio).

Specific implementation modes of the multicarrier transmission system include, but not limited to, an OFDM system, a filter-bank based multicarrier (Filter-bank Based Multicarrier, abbreviated as FBMC), multicarrier code-division-multiple-access (Multicarrier Code-Division-Multiple-Access, abbreviated as MC-CDMA), and etc., and these techniques have a common feature of modulating and demodulating multicarrier signals based on discrete Fourier transform (Discrete Fourier Transform, DFT). According to the sampling theorem, the spectrum of a digital signal is periodic, this may cause frequency spectrum aliasing and thus may seriously affect the performance; therefore, in a practical multicarrier system, virtual subcarriers are set at two edges of a sampling bandwidth of a baseband signal, and the virtual subcarriers do not transmit signals. For example, FIG. 1 is a schematic diagram of configuring subcarriers in an OFDM system in the prior art, a system sampling frequency (i.e., a sampling bandwidth of a baseband signal) is greater than a signal transmission bandwidth, there are guard subcarriers, data subcarriers, DC subcarriers and pilot subcarriers in the signal transmission bandwidth, and the spectrum width occupied by the virtual subcarriers is approximately the sampling bandwidth minus the signal transmission bandwidth.

All the current multicarrier systems are premised on a static frequency spectrum scenario, that is, the adopted signal transmission bandwidth is pre-divided and fixed. When the system is designed and the product is implemented, the number and the locations of virtual subcarriers have been solidified, and thereby it is difficult to apply in a dynamic frequency spectrum scenario.

SUMMARY

Embodiments of the present invention provide a method for dynamically setting virtual subcarriers, a receiving method, an apparatus and a system, so as to adaptively and dynamically set the number and the location of the virtual subcarriers, and to be more applicable to an application scenario of a dynamic frequency spectrum.

In one aspect, embodiments of the present invention provide a method for dynamically setting virtual subcarriers, applied to a multicarrier transmission system, including:

acquiring, by a transmitter of the multicarrier transmission system, dynamic spectrum information of a geographic location where the transmitter is located;

determining, by the transmitter, a number of left edge virtual subcarriers and a number of right edge virtual subcarriers of the multicarrier transmission system, according to the dynamic spectrum information, at left and right edges of a working spectrum of the transmitter, to make a sum of the number of the left edge virtual subcarriers and the number of the right edge virtual subcarriers be not less than an aliasing guard band of a baseband signal of the multicarrier transmission system, and be not greater than a dimension of discrete Fourier transform of the baseband signal; where, the aliasing guard band of the baseband signal is a minimum number of the virtual subcarriers required when spectrum aliasing of the baseband signal does not exceed a first preset threshold;

setting, by the transmitter, virtual subcarriers of the multicarrier transmission system according to the left edge virtual subcarriers and right edge virtual subcarriers determined.

In one aspect, embodiments of the present invention also provide an apparatus for dynamically setting virtual subcarriers, applied to a multicarrier transmission system, including:

a spectrum acquiring module, configured to acquire dynamic spectrum information of a geographic location where the apparatus for dynamically setting the virtual subcarriers is located;

a virtual subcarrier determining module, configured to determine a number of left edge virtual subcarriers and a number of right edge virtual subcarriers of the multicarrier transmission system, according to the dynamic spectrum information, at left and right edges of a working spectrum of the apparatus for dynamically setting the virtual subcarriers, to make a sum of virtual subcarriers at the left and right edges be not less than an aliasing guard band of a baseband signal of the multicarrier transmission system, and be not greater than a dimension of discrete Fourier transform of the baseband signal; where, the aliasing guard band of the baseband signal is a minimum number of the virtual subcarriers required when spectrum aliasing of the baseband signal does not exceed a first preset threshold;

a virtual subcarrier setting module, configured to set, by the transmitter, the virtual subcarriers of the multicarrier transmission system according to the number of the left edge virtual subcarriers and the number of the right edge virtual subcarriers determined.

In another aspect, embodiments of the present invention provide a method for receiving dynamic virtual subcarriers, applied to a multicarrier transmission system, including:

receiving, by a receiver, a virtual subcarrier adjustment indication sent by a transmitter, where the virtual subcarrier adjustment indication includes a number of left edge virtual subcarriers, a number of right edge virtual subcarriers and a virtual subcarrier adjustment time of the multicarrier transmission system; a sum of the number of the left edge virtual subcarriers and the number of the right edge virtual subcarriers is not less than an aliasing guard band of a baseband signal of the multicarrier transmission system, and is not greater than a dimension of discrete Fourier transform of the baseband signal; and the aliasing guard band of the baseband signal is a minimum number of the virtual subcarriers required when spectrum aliasing of the baseband signal does not exceed a first preset threshold;

determining, by the receiver, starting from a first subcarrier at the left edge of the working spectrum of the receiver and within the working spectrum, contiguous subcarriers a number of which equals the number of the left edge virtual subcarriers as a first group of virtual subcarriers, and selecting, by the receiver, starting from a last subcarrier at the right edge of the working spectrum and within the working spectrum, contiguous subcarriers a number of which equals the number of the right edge virtual subcarriers as a second group of virtual subcarriers;

setting, by the receiver, virtual subcarriers of the multicarrier transmission system according to the number of the first group of virtual subcarriers and the number of the second group of virtual subcarriers at the virtual subcarrier adjustment time.

In another aspect, embodiments of the present invention provide an apparatus for receiving dynamic virtual subcarriers, applied to a multicarrier transmission system, including:

an indication receiving module, configured to receive a virtual subcarrier adjustment indication sent by a transmitter, where the virtual subcarrier adjustment indication includes a number of left edge virtual subcarriers, a number of right edge virtual subcarriers and a virtual subcarrier adjustment time of the multicarrier transmission system; and a sum of the number of the left edge virtual subcarriers and the number of the right edge virtual subcarriers is not less than an aliasing guard band of a baseband signal of the multicarrier transmission system, and is not greater than a dimension of discrete Fourier transform of the baseband signal; and the aliasing guard band of the baseband signal is a minimum number of the virtual subcarriers required when working spectrum aliasing of the baseband signal does not exceed a first preset threshold;

a determining module, configured to determine, starting from a first subcarrier at a left edge of the apparatus for receiving the dynamic virtual subcarriers, within a working spectrum, contiguous subcarriers a number of which equals the number of the left edge virtual subcarriers as a first group of virtual subcarriers, and select, starting from a last subcarrier at the right edge of the working spectrum, within the working spectrum, contiguous subcarriers a number of which equals the number of right edge virtual subcarriers as a second group of virtual subcarriers;

a setting module, configured to set virtual subcarriers of the multicarrier transmission system according to the number of the first group of virtual subcarriers and the number of the second group of virtual subcarriers at the virtual subcarrier adjustment time.

In yet another aspect, embodiments of the present invention provide a method for receiving dynamic virtual subcarriers, applied to a multicarrier transmission system, including:

determining, by the receiver, after receiving a signal from the transmitter, starting from a first subcarrier at a left edge of a working spectrum of the receiver, contiguous subcarriers with a received signal strength being less than a second preset threshold as a first group of zero subcarriers, and determining, by the receiver, after removing a first guard subcarrier from the first group of zero subcarriers, the first group of zero subcarriers from which the first guard subcarrier has been removed as left edge virtual subcarriers;

determining, by the receiver, starting from a last subcarrier at a right edge of the working spectrum, contiguous subcarriers with a received signal strength being less than a third preset threshold as a second group of zero subcarriers, and determining, by the receiver, after removing a second guard subcarrier from the second group of zero subcarriers, the second group of zero subcarriers from which the second guard subcarrier has been removed as right edge virtual subcarriers; where, a sum of a number of the left edge virtual subcarriers and the number of the right edge virtual subcarriers is not less than an aliasing guard band of a baseband signal of the multicarrier transmission system, and is not greater than a dimension of discrete Fourier transform of the baseband signal; and the aliasing guard band of the baseband signal is a minimum number of the virtual subcarriers required when spectrum aliasing of the baseband signal does not exceed a first preset threshold.

In another aspect, embodiments of the present invention provide an apparatus for receiving dynamic virtual subcarriers, applied to a multicarrier transmission system, including:

a receiving module, configured to receive a signal from a transmitter;

a parsing module, configured to determine, after receiving a signal from the transmitter, starting from a first subcarrier at a left edge of a working spectrum of the apparatus for receiving the dynamic virtual subcarriers, contiguous subcarriers with a received signal strength being less than a second preset threshold as a first group of zero subcarriers, and determine, after removing a first guard subcarrier from the first group of zero subcarriers, the first group of zero subcarriers from which the first guard subcarrier has been removed as left edge virtual subcarriers;

the parsing module being further configured to determine, starting from a last subcarrier at a right edge of the working spectrum, contiguous subcarriers with a received signal strength being less than a third preset threshold as a second group of zero subcarriers, and determine, after removing a second guard subcarrier from the second group of zero subcarriers, the second group of zero subcarriers from which the second guard subcarrier has been removed as right edge virtual subcarriers; where a sum of a number of the left edge virtual subcarriers and a number of the right edge virtual subcarriers is not less than an aliasing guard band of a baseband signal of the multicarrier transmission system, and is not greater than a dimension of discrete Fourier transform of the baseband signal; and the aliasing guard band of the baseband signal is a minimum number of the virtual subcarriers required when spectrum aliasing of the baseband signal does not exceed a first preset threshold;

a setting module, configured to set virtual subcarriers of the multicarrier transmission system according to the number of the left edge virtual subcarriers and the number of the right edge virtual subcarriers.

In still another aspect, embodiments of the present invention also provide a multicarrier transmission system for dynamically setting virtual subcarriers, including:

a transmitter, configured to acquire dynamic spectrum information of a geographic location where the transmitter is located; and determine a number of left edge virtual subcarriers and a number of right edge virtual subcarriers of the multicarrier transmission system at left and right edges of a working spectrum of the transmitter, according to the dynamic spectrum information, to make a sum of the number of the left edge virtual subcarriers and the number of the right edge virtual subcarriers be not less than an aliasing guard band of a baseband signal of the multicarrier transmission system, and be not greater than a dimension of discrete Fourier transform of the baseband signal; the transmitter sets virtual subcarriers of the multicarrier transmission system according to the number of the left edge virtual subcarriers and the number of the right edge virtual subcarriers determined; and the aliasing guard band of the baseband signal is a minimum number of the virtual subcarriers required when spectrum aliasing of the baseband signal does not exceed a first preset threshold;

the transmitter being further configured to send, after determining the number of the left edge virtual subcarriers and the number of the right edge virtual subcarriers of the multicarrier transmission system, a virtual subcarrier adjustment indication to a receiver, where the virtual subcarrier adjustment indication includes the number of the left edge virtual subcarriers, the number of the right edge virtual subcarriers and a virtual subcarrier adjustment time of the multicarrier transmission system; and the receiver, configured to determine, after receiving the virtual subcarrier adjustment indication sent by the transmitter, starting from a first subcarrier at a left edge of a working spectrum of the receiver, within the working spectrum, contiguous subcarriers a number of which equals the number of the left edge virtual subcarriers as a first group of virtual subcarriers, select, starting from a last subcarrier at a right edge of the working spectrum, within the working spectrum, contiguous subcarriers a number of which equals the number of the right edge virtual subcarriers as a second group of virtual subcarriers; and set virtual subcarriers of the multicarrier transmission system according to the number of the first group of virtual subcarriers and the number of the second group of virtual subcarriers at the virtual subcarrier adjustment time.

In the technical solutions according to the embodiments of the present invention, in a condition that the total number of the virtual subcarriers is not less than an aliasing guard band of a baseband signal of the multicarrier transmission system, and is not more than a DFT dimension of the baseband signal, the transmitter determines the number and the location of two groups of virtual subcarriers at the left and right edges of the working spectrum according to the acquired dynamic spectrum information. Therefore, the transmitter can adaptively change the number and the location of the virtual subcarriers of the baseband signal according to the acquired dynamic spectrum information under the premise of guaranteeing that spectrum aliasing does not occur on a baseband signal of the multicarrier transmission system, thus make utilization of the dynamic spectrum flexibly and efficiently, and be more applicable to an application scenario of the dynamic spectrum.

DESCRIPTION OF EMBODIMENTS

The method and apparatus according to the embodiments of the present invention can be applied to a multicarrier transmission system. For example, systems, such as an OFDM system, an FBMC system and an MC-CDMA system, and also can be applied to a peer-to-peer network, such as two communication nodes of an Ad Hoc network. The transmitter in the embodiments of the present invention may be located within a base station or within a terminal. Correspondingly, the receiver may be located within a terminal or within a base station. The transmitter and the receiver are located on two communication nodes, respectively.

Figure 2A:
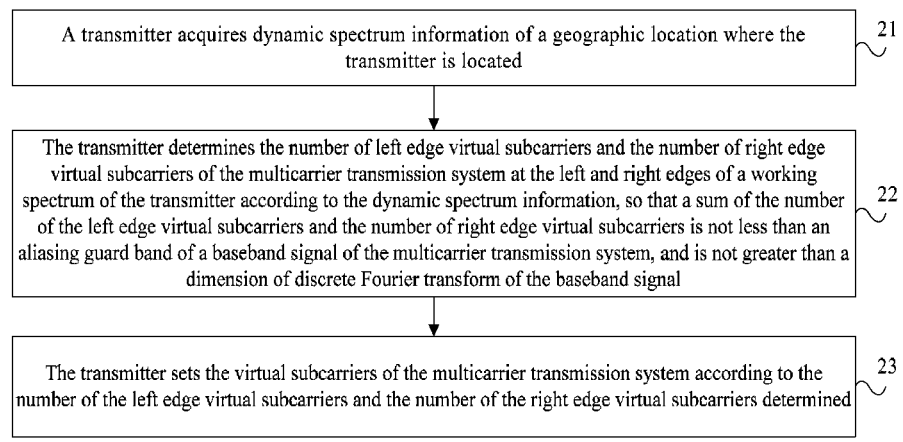
FIG. 2A is a flow chart of a method for dynamically setting virtual subcarriers according to an embodiment of the present invention.

FIG. 2A is a flow chart of a method for dynamically setting virtual subcarriers according to an embodiment of the present invention. As shown in FIG. 2A, the method in this embodiment includes:

Step 21: A transmitter acquires dynamic spectrum information of a geographic location where the transmitter is located.

The transmitter acquires dynamic spectrum information of the geographic location where the transmitter is currently located through a local built-in spectrum sensing module, or the transmitter acquires the dynamic spectrum information of the current geographic location by accessing a remote spectrum database. The spectrum corresponding to the dynamic spectrum information acquired by the transmitter can be a blank spectrum, for example, a spectrum from xMHz to yMHz is a blank spectrum, and a spectrum from aMHz to bMHz is the spectrum being occupied by other system.

Step 22: The transmitter determines the number of left edge virtual subcarriers and the number of right edge virtual subcarriers of the multicarrier transmission system at the left and right edges of a working spectrum of the transmitter, according to the dynamic spectrum information, so that a sum of the number of the left edge virtual subcarriers and the number of right edge virtual subcarriers is not less than an aliasing guard band of a baseband signal of the multicarrier transmission system, and is not greater than a dimension of discrete Fourier transform of the baseband signal. Particularly, the aliasing guard band of the baseband signal is a minimum number of the virtual subcarriers required when spectrum aliasing of the baseband signal does not exceed a first preset threshold.

When there is a need to dynamically adjust virtual subcarriers after dynamic spectrum information is acquired, for example, when the acquired dynamic spectrum information changes or a time for periodically determining the virtual subcarriers arrives, the transmitter determines two groups of virtual subcarriers at the left and right edges of the working spectrum of the transmitter according to the acquired dynamic spectrum information. The sampling bandwidth of the multicarrier transmission system quantitatively equals to the sampling frequency of the baseband signal of the multicarrier transmission system. It should be noted that, the multicarrier transmission system occupies a large spectrum, but the transmitter only works on a part of the spectrum, which is called a working spectrum, and the bandwidth of the working spectrum equals to the sampling frequency of the baseband signal of the multicarrier transmission system. Generally, in the multicarrier transmission system, the working spectrum of the transmitter is the same as the working spectrum of the receiver.

The transmitter determines the left edge virtual subcarriers and the right edge virtual subcarriers at the left edge and the right edge of its working spectrum respectively. That is to say, the transmitter determines one group of virtual subcarriers at the left edge of the working spectrum, and another group of virtual subcarriers at the right edge of the working spectrum, according to the dynamic spectrum information. When the transmitter re-determines virtual subcarriers according to the acquired dynamic spectrum information, an aliasing guard band of the baseband signal and a DFT dimension of the baseband signal should also be taken into consideration, so that a total number of two groups of the re-determined virtual subcarriers is not less than the aliasing guard band of the baseband signal, and is not greater than the DFT dimension of the baseband signal. Particularly, the aliasing guard band of the baseband signal is a minimum number of the virtual subcarriers required when a spectrum aliasing of the baseband signal does not exceed a first preset threshold, that is, a minimum number of the virtual subcarriers required for avoiding the occurrence of the spectrum aliasing on the spectrum of the baseband signal. The dimension of the discrete Fourier transform (discrete Fourier transform, DFT) can be the number of signal sampling points processed in a single inverse discrete Fourier transform (Inverse discrete Fourier transform, IDFT) or a single inverse fast Fourier transform (Inverse fast Fourier transform, IFFT), when the multicarrier baseband signal is modulated by the multicarrier transmission system.

Step 23: The transmitter sets the virtual subcarriers of the multicarrier transmission system according to the number of the left edge virtual subcarriers and the number of the right edge virtual subcarriers determined.

Figure 2B:
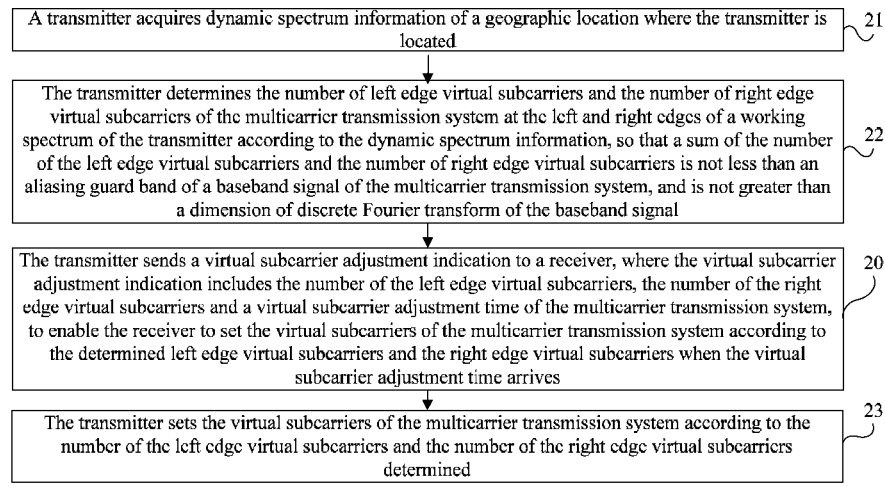
FIG. 2B is a flow chart of another method for dynamically setting virtual subcarriers according to an embodiment of the present invention.

Further, as shown in FIG. 2B, after step 22, the method further can include:

Step 20: The transmitter sends a virtual subcarrier adjustment indication to a receiver, where the virtual subcarrier adjustment indication includes the number of the left edge virtual subcarriers, the number of the right edge virtual subcarriers and a virtual subcarrier adjustment time of the multicarrier transmission system, to enable the receiver to set the virtual subcarriers of the multicarrier transmission system according to the determined left edge virtual subcarriers and the right edge virtual subcarriers when the virtual subcarrier adjustment time arrives.

After determining the virtual subcarriers of the multicarrier transmission system according to the dynamic spectrum information, the transmitter can send the virtual subcarrier adjustment indication to the receiver, so as to notify the receiver of the number of the left edge virtual subcarriers, the number of the right edge virtual subcarriers and the virtual subcarrier adjustment time of the multicarrier transmission system. The receiver sets the virtual subcarriers of the multicarrier transmission system according to the determined left edge virtual subcarriers and right edge virtual subcarriers when the virtual subcarrier adjustment time arrives.

In the method according to this embodiment, the transmitter determines the number and the location of two groups of the virtual subcarriers, at the left and right edges of the working spectrum of the transmitter, according to the acquired dynamic spectrum information, in a condition that a total number of virtual subcarriers is not less than the aliasing guard band of the baseband signal of the multicarrier transmission system and is not greater than the DFT dimension of the baseband signal. Therefore, the transmitter can adaptively change the number and the location of the virtual subcarriers of the baseband signal according to the dynamic spectrum information under the premise of guaranteeing that spectrum aliasing does not occur on a baseband signal of the multicarrier transmission system, thus make utilization of the dynamic spectrum flexibly and efficiently, and be more applicable to an application scenario of the dynamic spectrum.

Figure 3A:
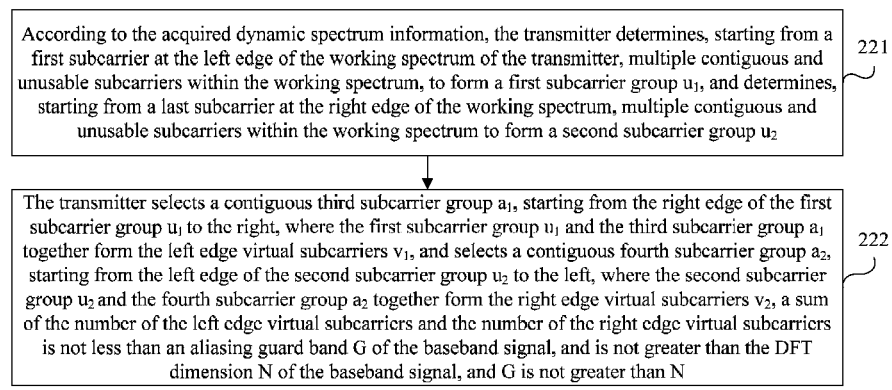
FIG. 3A is a flow chart of still another method for dynamically setting virtual subcarriers according to an embodiment of the present invention.
Figure 3B:
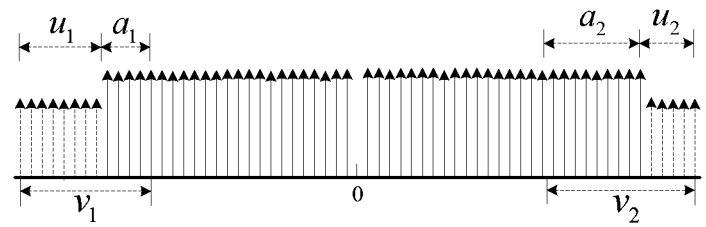
FIG. 3B is a schematic diagram of selecting virtual subcarriers according to an embodiment of the present invention.

FIG. 3A is a flow chart of a method for dynamically setting virtual subcarriers according to an embodiment of the present invention. FIG. 3B is a schematic diagram of selecting virtual subcarriers according to an embodiment of the present invention. As shown in FIG. 3A, step 22 specifically can include:

Step 221: According to the acquired dynamic spectrum information, the transmitter determines, starting from a first subcarrier at the left edge of the working spectrum of the transmitter, multiple contiguous and unusable subcarriers within the working spectrum, to form a first subcarrier group $u_1$, and determines, starting from a last subcarrier at the right edge of the working spectrum, multiple contiguous and unusable subcarriers within the working spectrum to form a second subcarrier group $u_2$.

Here, the unusable subcarriers are subcarriers corresponding to unusable spectrum locations of the transmitter. Correspondingly, the first subcarrier group and the second subcarrier group respectively are a part of subcarriers corresponding to the unusable spectrum locations of the transmitter.

Step 222: The transmitter selects a contiguous third subcarrier group $a_1$, starting from the right edge of the first subcarrier group $u_1$ to the right, where the first subcarrier group $u_1$ and the third subcarrier group $a_1$ together form the left edge virtual subcarriers $v_1$, and selects a contiguous fourth subcarrier group $a_2$, starting from the left edge of the second subcarrier group $u_2$ to the left, where the second subcarrier group $u_2$ and the fourth subcarrier group $a_2$ together form the right edge virtual subcarriers $v_2$, a sum of the number of the left edge virtual subcarriers and the number of the right edge virtual subcarriers is not less than an aliasing guard band G of the baseband signal, and is not greater than the DFT dimension N of the baseband signal, and G is not greater than N.

The transmitter selects a contiguous third subcarrier group $a_1$ starting from the right edge of the first subcarrier group $u_1$ to the right within its working spectrum, and the first subcarrier group $u_1$ and the third subcarrier group $a_1$ together form the left edge virtual subcarriers $v_1$. The transmitter selects a contiguous fourth subcarrier group $a_2$ starting from the left edge of the second subcarrier group $u_2$ to the left within its working spectrum, and the second subcarrier group $u_2$ and the fourth subcarrier group $a_2$ together form the right edge virtual subcarriers $v_2$.

Before step 221, the transmitter acquires the DFT dimension N of the baseband signal, and selects the aliasing guard band G of the baseband signal, and the aliasing guard band is selected so that the spectrum aliasing of the baseband signal does not exceed a first preset threshold, the specific value of the first threshold value can be obtained from a standard definition or a product parameter in a public material, and different application systems have different preset thresholds.

The number of the first subcarrier group $v_1$, the number of the third subcarrier group $a_1$, the number of the second virtual subcarrier group $u_2$ and the number of the fourth virtual subcarrier group $a_2$ are all nonnegative integers. As shown in FIG. 3B, the first subcarrier group $v_1$, the third subcarrier group $a_1$, the second virtual subcarrier $u_2$ and the fourth virtual subcarrier group $a_2$ are all contiguous subcarriers, the number of $v_1$ equals to the number of $u_1$ plus the number of $a_1$, and the number of $v_2$ equals to the number of $u_2$ plus the number of $a_2$. $v_1$ and $v_2$ satisfy the following conditions: the number of $v_1$ plus the number of $v_2$ is less than or equal to N, and greater than or equal to G.

In the method according to this embodiment, in a condition of preventing the spectrum aliasing of the baseband signal from exceeding the first preset threshold, the transmitter adaptively sets the number and the location of virtual subcarriers at both edges of its working spectrum according to the dynamic spectrum information, so that a bandwidth and an occupied spectrum of the baseband signal can adaptively change, the spectrum dynamic range of the baseband signal is expanded, thus less software and hardware devices are required for covering the given spectrum, and cost and power consumption are reduced.

Figure 3C:
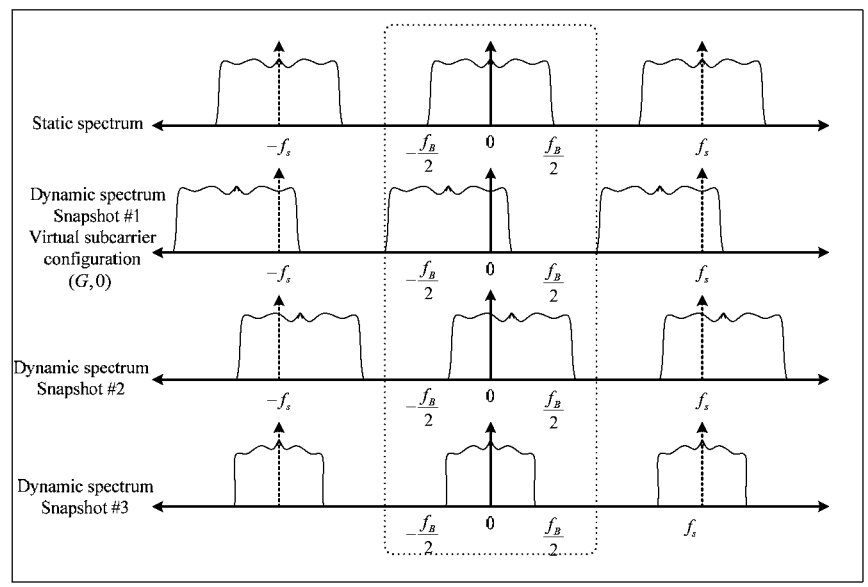
FIG. 3C is a schematic comparison diagram of a static periodic spectrum and a dynamic periodic spectrum of a baseband signal according to an embodiment of the present invention.

FIG. 3C is a schematic comparison diagram of a static periodic spectrum and a dynamic periodic spectrum of a baseband signal according to an embodiment of the present invention. As shown in FIG. 3C, a virtual subcarrier configuration vector of a static spectrum and a virtual subcarrier configuration vector of a dynamic spectrum at three arbitrary times are as follows: the static spectrum (0.5G, 0.5G); Snapshot #1 (0, G); Snapshot #2 (0.75G, 0.25G): Snapshot #3 (0.75G, 0.75G). The part inside the dashed-line block indicates the spectrum of an analog multicarrier baseband signal after a digital to analog conversion, that is, the spectrum of an analog baseband signal actually transmitted by the system, and it can be seen from FIG. 3C that, after dynamically setting the virtual subcarriers, the signal transmission bandwidth can adaptively change with the wireless environment within a sampling bandwidth range of $$\left[-\frac{f_s}{2}, \frac{f_s}{2}\right],$$

where $f_s$ indicates the sampling bandwidth, and $f_B$ indicates the signal transmission bandwidth.

Figure 3D:
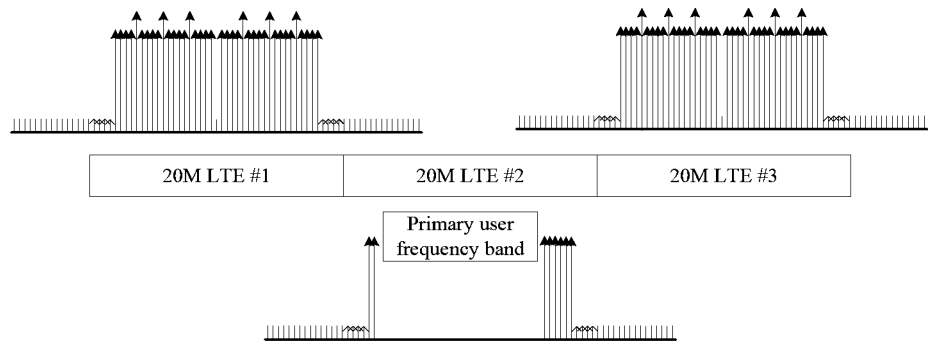
FIG. 3D is a schematic diagram of covering a 60M target frequency band with 3 sets of LTE channels according to an embodiment of the present invention.

FIG. 3D is a schematic diagram of covering a 60 MHz target frequency band with 3 sets of LTE channels according to an embodiment of the present invention. As shown in FIG. 3D, LTE#1 channel, LTE#2 channel and LTE#3 channel cover a 60 MHz target frequency band, virtual subcarriers of LTE#1 channel, LTE#2 channel and LTE#3 channel actually cover the frequency bands of adjacent channels, since virtual subcarriers do not transmit data, no interference will occur. In a condition that the number and location of virtual subcarriers are fixed, if a primary user appears, a non-contiguous orthogonal frequency-division multiplexing (Non-Contiguous OFDM, abbreviated as NC-OFDM) manner can be used to turn off the data subcarrier and the pilot subcarrier in a frequency band corresponding to the primary user, that is, to turn off the blank area of LTE #3 in FIG. 3D.

Figure 3E:
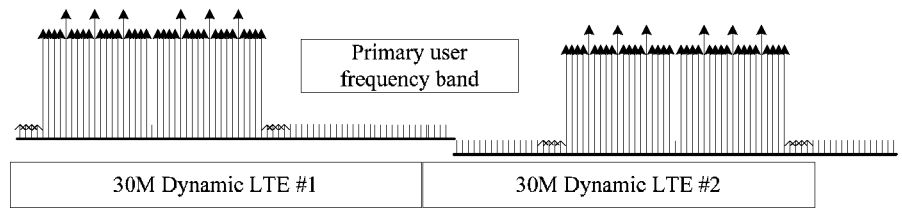
FIG. 3E is a schematic diagram of covering a 60 MHz target frequency band with 2 sets of LTE channels according to an embodiment of the present invention.

As shown in FIG. 3E, with the method for dynamically setting the virtual subcarriers according to the present invention, a single LTE channel can cover a frequency band of about 30 MHz, and only 2 sets of LTE channels are needed to cover a 60 MHz target frequency band. When primary user interference occurs, the above NC-OFDM manner can be adopted to set data subcarriers and pilot subcarriers within the signal transmission bandwidth to be zero, or, virtual subcarriers can be used to cover the frequency band of the primary user to avoid turning off useful data and pilot subcarriers and improve spectrum efficiency. As shown in FIG. 3E, the number of left edge virtual subcarriers of Dynamic LTE#1 channel is reduced, and the number of right edge virtual subcarriers is increased correspondingly, so that the signal transmission bandwidth moves to the left on the whole, so as to avoid the primary user interference and also avoid the useful subcarriers being turned off.

Figure 4A:
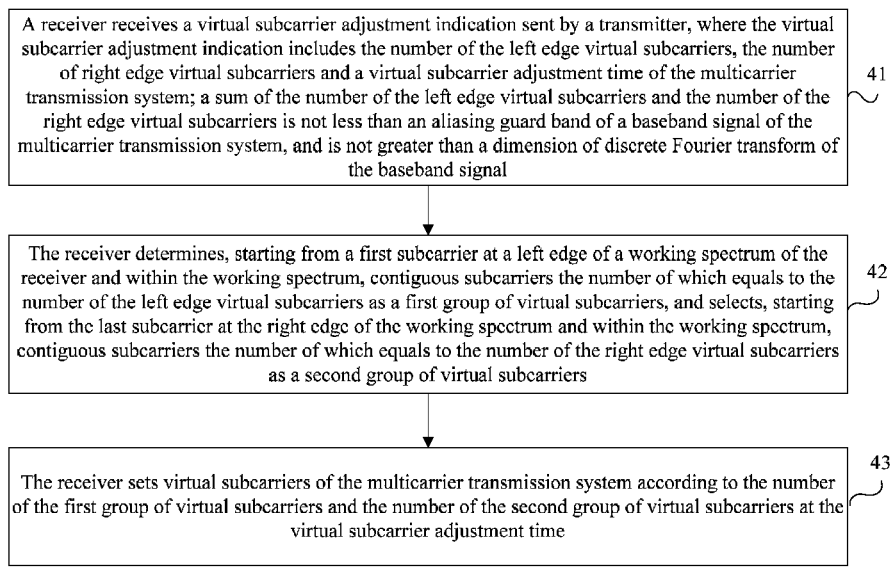
FIG. 4A is a flow chart of a method for receiving dynamic virtual subcarriers according to an embodiment of the present invention.

FIG. 4A is a flow chart of a method for receiving dynamic virtual subcarriers according to an embodiment of the present invention. This embodiment is mainly to describe how the receiver sets virtual subcarriers according to a virtual subcarrier adjustment indication sent by a transmitter. As shown in FIG. 4A, the method in this embodiment includes:

Step 41: A receiver receives a virtual subcarrier adjustment indication sent by a transmitter, where the virtual subcarrier adjustment indication includes the number of the left edge virtual subcarriers and the number of right edge virtual subcarriers as well as a virtual subcarrier adjustment time of the multicarrier transmission system; where, a sum of the number of the left edge virtual subcarriers and the number of the right edge virtual subcarriers is not less than an aliasing guard band of a baseband signal of the multicarrier transmission system, and is not greater than a dimension of discrete Fourier transform of the baseband signal; and the aliasing guard band of the baseband signal is a minimum number of the virtual subcarriers required when spectrum aliasing of the baseband signal does not exceed a first preset threshold.

Particularly, the virtual subcarrier adjustment time includes a frame number and/or a subframe number of the multicarrier transmission system on a time dimension. The multicarrier transmission system includes an orthogonal frequency-division multiplexing system, a filter-bank based multicarrier system or a multicarrier code-division-multiple-access system. The dimension of discrete Fourier transform of the baseband signal is the number of signal sampling points included in a single discrete Fourier transform or a single fast Fourier transform, when the baseband signal of the multicarrier signal is demodulated in the multicarrier transmission system.

Step 42: The receiver determines, starting from a first subcarrier at a left edge of a working spectrum of the receiver and within the working spectrum, contiguous subcarriers the number of which equals to the number of the left edge virtual subcarriers as a first group of virtual subcarriers, and selects, starting from the last subcarrier at the right edge of the working spectrum and within the working spectrum, contiguous subcarriers the number of which equals to the number of the right edge virtual subcarriers as a second group of virtual subcarriers.

Figure 4B:
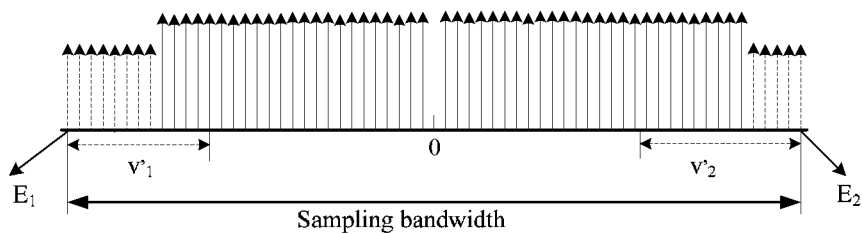
FIG. 4B is a schematic diagram of selecting virtual subcarriers by a terminal according to an embodiment of the present invention.

As shown in FIG. 4B, the receiver selects, within the working spectrum, and starting from a first subcarrier $E_1$ at the left edge of the working spectrum of the receiver, contiguous subcarriers $v_1$ the number of which equals to the number of the left edge virtual subcarriers, as a first group of virtual subcarriers $v'_1$; and likewise, the terminal selects, within the working spectrum, starting from a last subcarrier $E_2$ at the right edge of the working spectrum, contiguous subcarriers $v_2$ the number of which equals to the number of the right edge virtual subcarriers as a second group of virtual subcarriers $v'_2$.

Step 43: The receiver sets virtual subcarriers of the multicarrier transmission system according to the number of the first group of virtual subcarriers and the number of the second group of virtual subcarriers at the virtual subcarrier adjustment time.

In the method for receiving dynamic virtual subcarriers in this embodiment, the receiver dynamically adjusts the number and the location of virtual subcarriers of the received signal according to the virtual subcarrier adjustment indication sent by the transmitter, a spectrum dynamic range of the baseband signal is expanded, thus less software and hardware devices are required for covering the given spectrum, and cost and power consumption are reduced.

Figure 5:
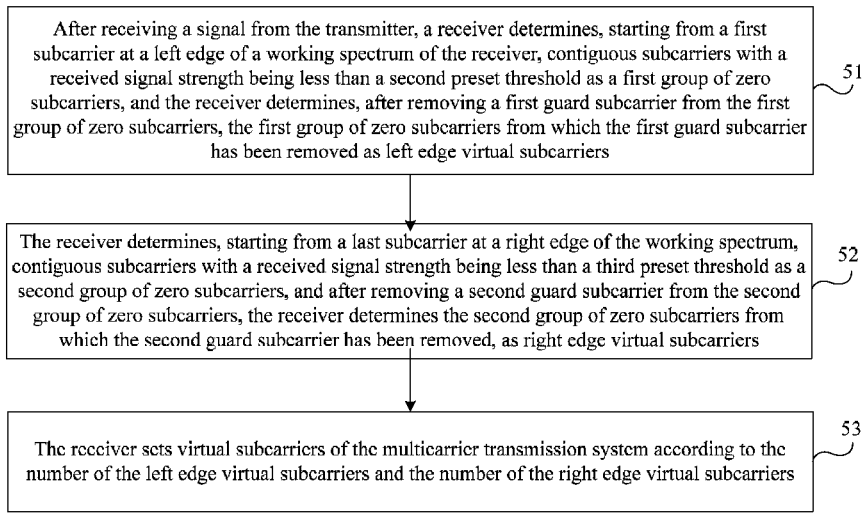
FIG. 5 is a flow chart of another method for receiving dynamic virtual subcarriers according to an embodiment of the present invention.

FIG. 5 is a flow chart of another method for receiving dynamic virtual subcarriers according to an embodiment of the present invention. After determining two groups of the virtual subcarriers of the multicarrier transmission system according to the dynamic spectrum information acquired in real time, the transmitter needs not transmit a virtual subcarrier adjustment indication to the receiver, and, instead, the receiver performs a blind detection to the received signal to determine which subcarrier is a virtual subcarrier. As shown in FIG. 5, the method in this embodiment includes:

Step 51: After receiving a signal from the transmitter, a receiver determines, starting from a first subcarrier at a left edge of a working spectrum of the receiver, contiguous subcarriers with a received signal strength being less than a second preset threshold as a first group of zero subcarriers, and the receiver determines, after removing a first guard subcarrier from the first group of zero subcarriers, the first group of zero subcarriers from which the first guard subcarrier has been removed as left edge virtual subcarriers.

Step 52: The receiver determines, starting from a last subcarrier at a right edge of the working spectrum, contiguous subcarriers with a received signal strength being less than a third preset threshold as a second group of zero subcarriers, and after removing a second guard subcarrier from the second group of zero subcarriers, the receiver determines the second group of zero subcarriers from which the second guard subcarrier has been removed, as right edge virtual subcarriers. Where, a sum of the number of the left edge virtual subcarriers and the number of the right edge virtual subcarriers is not less than an aliasing guard band of a baseband signal of the multicarrier transmission system, and is not greater than a dimension of discrete Fourier transform of the baseband signal; and the aliasing guard band of the baseband signal is a minimum number of the virtual subcarriers required when spectrum aliasing of the baseband signal does not exceed a first preset threshold.

Step 53: The receiver sets virtual subcarriers of the multicarrier transmission system according to the number of the left edge virtual subcarriers and the number of the right edge virtual subcarriers.

Figure 1:
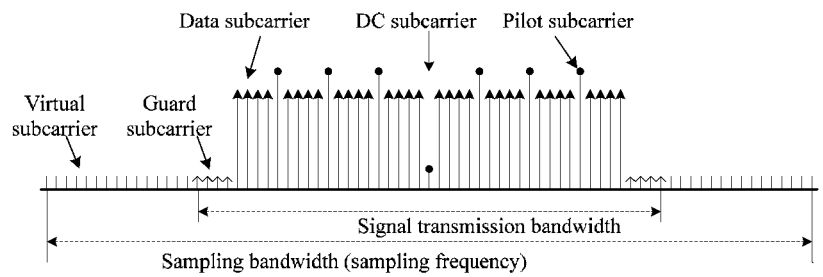
FIG. 1 is a schematic diagram of configuring subcarriers in an OFDM system in the prior art.

The receiver judges a received signal strength on each subcarrier after receiving a signal, if the received signal strength at the left edge is less than a second preset threshold, then data received on the subcarrier can be considered to be 0. If the received signal strength at the right edge is less than a third preset threshold, then data received on the subcarrier can be considered to be 0. As shown in FIG. 1, the data received on the data subcarriers and the pilot subcarriers are not 0, and the data received on the virtual subcarriers and the guard subcarriers are 0. Particularly, the guard subcarriers are used to prevent out-of-band radiation; the data subcarriers are used to transmit user data and signaling; the pilot subcarriers are used to transmit pilot which is used for channel estimation and measurement; the DC subcarriers are used to prevent a local oscillation leakage. Specific values of the second preset threshold and the third preset threshold can be obtained from a standard definition or a product parameter in a public material, and different application systems have different preset thresholds.

Generally, the number and the location of the guard subcarriers of the multicarrier transmission system are fixed, and can be easily obtained from a public material, and the received signal strength of the guard subcarriers is also less than the above preset threshold. As shown in FIG. 1, the positions of the two groups of guard subcarriers are respectively adjacent to the subcarrier with transmission data of 1. After the receiver removes the guard subcarriers from the subcarriers with the received signal strength being less than the above preset threshold, the remaining subcarriers with the received signal strength being less than the above preset threshold are the virtual subcarriers.

The multicarrier transmission system includes an orthogonal frequency-division multiplexing system, a filter-bank based multicarrier system or a multicarrier code-division-multiple-access system. The dimension of the discrete Fourier transform of the baseband signal is the number of signal sampling points included in a single discrete Fourier transform or a single fast Fourier transform, when the baseband signal of the multicarrier signal is modulated in the multicarrier transmission system.

In the method according to this embodiment, the receiver does not receive a virtual subcarrier adjustment indication from the transmitter, but performs a blind detection after receiving a signal, determines subcarriers with a received signal strength being less than the preset threshold according to the received signal strength on each subcarrier, then removes the guard subcarriers from the subcarriers with the received signal strength being less than the preset threshold, and the remaining subcarriers are the virtual subcarriers.

Figure 6A:
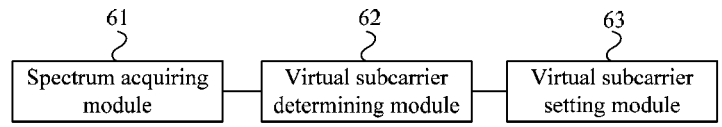
FIG. 6A is a schematic structural diagram of an apparatus for dynamically setting virtual subcarriers according to an embodiment of the present invention.

FIG. 6A is a schematic structural diagram of an apparatus for dynamically setting virtual subcarriers according to an embodiment of the present invention. As shown in FIG. 6A, the apparatus in this embodiment includes: a spectrum acquiring module 61, a virtual subcarrier determining module 62 and a virtual subcarrier setting module 63.

The spectrum acquiring module 61 is configured to acquire dynamic spectrum information of a geographic location where the apparatus for dynamically setting the virtual subcarriers is located.

In particular, the spectrum acquiring module is specifically configured to acquire the dynamic spectrum information of the geographic location where the apparatus is located through a built-in spectrum sensing module of the apparatus or by accessing a remote spectrum database.

The virtual subcarrier determining module 62 is configured to determine the number of the left edge virtual subcarriers and the number of right edge virtual subcarriers of the multicarrier transmission system at left and right edges of a working spectrum of the apparatus for dynamically setting the virtual subcarriers according to the dynamic spectrum information acquired by the spectrum acquiring module 61, so that a sum of the number of the left edge virtual subcarriers and the number of the right edge virtual subcarriers is not less than an aliasing guard band of a baseband signal of the multicarrier transmission system and is not greater than a dimension of discrete Fourier transform of the baseband signal; where the aliasing guard band of the baseband signal is a minimum number of the virtual subcarriers required when spectrum aliasing of the baseband signal does not exceed a first preset threshold.

The virtual subcarrier setting module 63 is configured to set, by the transmitter, the virtual subcarriers of the multicarrier transmission system according to the number of the left edge virtual subcarriers and the number of the right edge virtual subcarriers determined by the virtual subcarrier determining module 62. The virtual subcarrier adjustment time includes a frame number and/or a subframe number of the multicarrier transmission system on a time dimension.

For the functions of the modules in FIG. 6A, reference can be made to descriptions of corresponding embodiment in FIG. 2A, and accordingly the details will not be repeated herein.

Figure 6B:
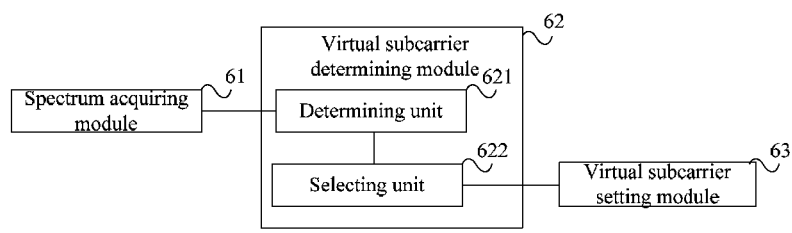
FIG. 6B is a schematic structural diagram of another apparatus for dynamically setting virtual subcarriers according to an embodiment of the present invention.

In particular, as shown in FIG. 6B, the virtual subcarrier determining module 62 includes a determining unit 621 and a selecting unit 622 on the basis of FIG. 6A.

The determining unit 621 is configured to determine, starting from a first subcarrier at the left edge of the working spectrum of the apparatus for dynamically setting virtual subcarriers, multiple contiguous and unusable subcarriers within the working spectrum, to form a first subcarrier group, and determine, starting from a last subcarrier at the right edge of the working spectrum, multiple contiguous and unusable subcarriers within the working spectrum to form a second subcarrier group, according to the dynamic spectrum information acquired by the spectrum acquiring module 61.

The selecting unit 622 is configured to select, starting from the right edge of the first subcarrier group to the right, multiple contiguous subcarriers to form a third subcarrier group, where the first subcarrier group and the third subcarrier group together form the left edge virtual subcarriers, and select, starting from the left edge of the second subcarrier group to the left, multiple contiguous subcarriers to form a fourth subcarrier group, where the second subcarrier group and the fourth subcarrier group together form the right edge virtual subcarriers, where a sum of the number of the left edge virtual subcarriers and the number of the right edge virtual subcarriers is not less than the aliasing guard band of the baseband signal, and is not greater than a dimension of discrete Fourier transform of the baseband signal.

For the functions of the modules in FIG. 6B, reference can be made to the descriptions of corresponding embodiment in FIG. 2C, and accordingly the details will not be repeated herein.

Figure 6C:
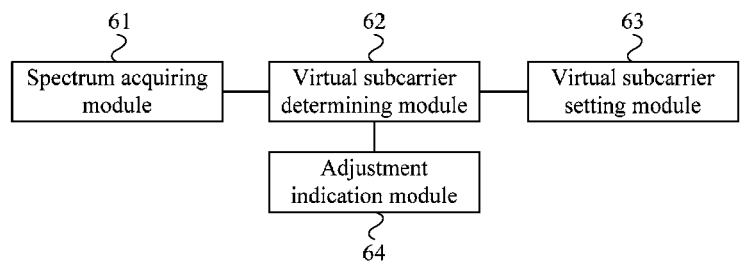
FIG. 6C is a schematic structural diagram of still another apparatus for dynamically setting virtual subcarriers according to an embodiment of the present invention.

Further, the transmitter actively notifies the receiver of the number of the adjusted virtual subcarriers, after dynamically setting the virtual subcarriers. As shown in FIG. 6C, on the basis of FIG. 6A or FIG. 6B, further including: an adjustment indication module 64, configured to send a virtual subcarrier adjustment indication to a receiver, after the determining module 62 determines the number of the left edge virtual subcarriers and the number of the right edge virtual subcarriers of the multicarrier transmission system, where the virtual subcarrier adjustment indication includes the number of the left edge virtual subcarriers and the number of the right edge virtual subcarriers as well as a virtual subcarrier adjustment time of the multicarrier transmission system, to enable the receiver to set the virtual subcarriers of the multicarrier transmission system according to the determined left edge virtual subcarriers and right edge virtual subcarriers, when the virtual subcarrier adjustment time arrives.

For the functions of the modules in FIG. 6C, reference can be made to the descriptions of corresponding embodiment in FIG. 2B, and accordingly the details will not be repeated further herein.

The multicarrier transmission system can be an orthogonal frequency-division multiplexing system, a filter-bank based multicarrier system or a multicarrier code-division-multiple-access system, but is not limited to the above systems.

Figure 7:
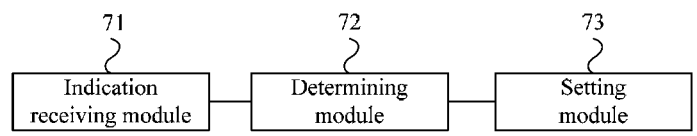
FIG. 7 is a schematic structural diagram of an apparatus for receiving dynamic virtual subcarriers according to an embodiment of the present invention.

FIG. 7 is a schematic structural diagram of an apparatus for receiving dynamic virtual subcarriers according to an embodiment of the present invention. This apparatus in this embodiment sets virtual subcarriers according to a virtual subcarrier adjustment indication provided by a transmitter. As shown in FIG. 7, the apparatus in this embodiment includes an indication receiving module 71, a determining module 72 and a setting module 73.

The indication receiving module 71 is configured to receive a virtual subcarrier adjustment indication sent by a transmitter, where the virtual subcarrier adjustment indication includes the number of left edge virtual subcarriers and the number of right edge virtual subcarriers as well as a virtual subcarrier adjustment time of the multicarrier transmission system; where a sum of the number of the left edge virtual subcarriers and the number of the right edge virtual subcarriers is not less than an aliasing guard band of a baseband signal of the multicarrier transmission system, and is not greater than a dimension of discrete Fourier transform of the baseband signal; and the aliasing guard band of the baseband signal is a minimum number of the virtual subcarriers required when spectrum aliasing of the baseband signal does not exceed a first preset threshold. The virtual subcarrier adjustment time includes a frame number and/or a subframe number of the multicarrier transmission system on a time dimension. The dimension of discrete Fourier transform is the number of signal sampling points included in a single discrete Fourier transform or a single fast Fourier transform, when the baseband signal of the multicarrier transmission system is demodulated.

The determining module 72 is configured to determine, within the working spectrum and starting from a first subcarrier at the left edge of the working spectrum of the apparatus for receiving the dynamic virtual subcarriers, contiguous subcarriers the number of which equals to the number of the left edge virtual subcarriers as a first group of virtual subcarriers, and select, within the working spectrum and starting from a last subcarrier at the right edge of the working spectrum, contiguous subcarriers the number of which equals the number of the right edge virtual subcarriers, as a second group of virtual subcarriers. Particularly, the number of the left edge virtual subcarriers and the number of the right edge virtual subcarriers are information in the virtual subcarrier adjustment indication received by the indication receiving module 71.

The setting module 73 is configured to set virtual subcarriers of the multicarrier transmission system according to the number of the first group of virtual subcarriers and the number of the second group of virtual subcarriers at the virtual subcarrier adjustment time.

The multicarrier transmission system can be an orthogonal frequency-division multiplexing system, a filter-bank based multicarrier system or a multicarrier code-division-multiple-access system, but is not limited to the above systems. For the functions of the modules in FIG. 7, reference can be made to the descriptions of corresponding embodiment in FIG. 4, and accordingly the details will not be repeated herein.

Figure 8:
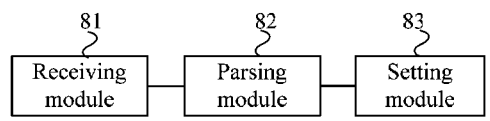
FIG. 8 is a schematic structural diagram of another apparatus for receiving dynamic virtual subcarriers according to an embodiment of the present invention.

FIG. 8 is a schematic structural diagram of another apparatus for receiving dynamic virtual subcarriers according to an embodiment of the present invention. As shown in FIG. 8, the apparatus in this embodiment includes a receiving module 81, a parsing module 82 and a setting module 83.

The receiving module 81 is configured to receive a signal from a transmitter.

The parsing module 82 is configured to determine, after the receiving module 81 receives a signal, starting from a first subcarrier at a left edge of a working spectrum of the apparatus for receiving the dynamic virtual subcarriers, contiguous subcarriers with a received signal strength being less than a second preset threshold as a first group of zero subcarriers, and determine, after removing a first guard subcarrier from the first group of zero subcarriers, the first group of zero subcarriers form which the first guard subcarrier has been removed as left edge virtual subcarriers.

After the receiving module 81 receives the signal, the parsing module 82 is further configured to determine, starting from a last subcarrier at the right edge of the working spectrum, contiguous subcarriers with a received signal strength being less than a third preset threshold as a second group of zero subcarriers, and determine, after removing a second guard subcarrier from the second group of zero subcarriers, the second group of zero subcarriers from which the second guard subcarrier has been removed as right edge virtual subcarriers; where a sum of the number of the left edge virtual subcarriers and the number of the right edge virtual subcarriers is not less than an aliasing guard band of a baseband signal of the multicarrier transmission system, and is not greater than a dimension of discrete Fourier transform of the baseband signal; and the aliasing guard band of the baseband signal is a minimum number of the virtual subcarriers required when spectrum aliasing of the baseband signal does not exceed a first preset threshold.

The setting module 83 is configured to set the virtual subcarriers of the multicarrier transmission system according to the numbers of the left edge virtual subcarriers and the number of the right edge virtual subcarriers parsed out by the parsing module 82.

The multicarrier transmission system can be an orthogonal frequency-division multiplexing system, a filter-bank based multicarrier system or a multicarrier code-division-multiple-access system, but is not limited to the above systems. For the functions of the modules in FIG. 8, reference can be made to the descriptions of corresponding embodiment in FIG. 5, and accordingly the details will not be repeated herein.

The embodiments of the present invention also provide a multicarrier transmission system for dynamically setting virtual subcarriers. In the system, the transmitter will notify the receiver of the number of the set virtual subcarriers after dynamically setting the virtual subcarriers, and the transmitter and the receiver in the system have specific functions as follows:

The transmitter is configured to acquire dynamic spectrum information of the geographic location where the transmitter is located; and determine the number of left edge virtual subcarriers and the number of right edge virtual subcarriers of the multicarrier transmission system at the left and right edges of a working spectrum of the transmitter according to the dynamic spectrum information, to make a sum of the number of the left edge virtual subcarriers and the number of the right edge virtual subcarriers be not less than an aliasing guard band of a baseband signal of the multicarrier transmission system, and be not greater than a dimension of discrete Fourier transform of the baseband signal; the transmitter sets virtual subcarriers of the multicarrier transmission system according to the number of the left edge virtual subcarriers and the number of the right edge virtual subcarriers determined; and the aliasing guard band of the baseband signal is a minimum number of the virtual subcarriers required when spectrum aliasing of the baseband signal does not exceed a first preset threshold.

The transmitter is specifically configured to acquire the dynamic spectrum information of the geographic location where it is located through a built-in spectrum sensing module or by accessing a remote spectrum database.

The transmitter is further configured to send a virtual subcarrier adjustment indication to a receiver after determining the number of the left edge virtual subcarriers and the number of the right edge virtual subcarriers of the multicarrier transmission system, where the virtual subcarrier adjustment indication includes the number of the left edge virtual subcarriers and the right edge virtual subcarriers as well as a virtual subcarrier adjustment time of the multicarrier transmission system;

the receiver is configured to determine, after receiving the virtual subcarrier adjustment indication sent by the transmitter, starting from a first subcarrier at a left edge of a working spectrum of the receiver and within the working spectrum, contiguous subcarriers the number of which equals the number of the left edge virtual subcarriers as a first group of virtual subcarriers, and the receiver selects, starting from a last subcarrier at a right edge of the working spectrum of the receiver, within the working spectrum, contiguous subcarriers the number of which equals the number of the right edge virtual subcarriers as a second group of virtual subcarriers; and set the virtual subcarriers of the multicarrier transmission system according to the number of the first group of virtual subcarriers and the number of the second group of virtual subcarriers at the virtual subcarrier adjustment time.

Particularly, for the transmitter, reference can be made to the descriptions of corresponding embodiment in FIG. 2A, FIG. 2B or FIG. 2C, and for the receiver, reference can be made to the descriptions of corresponding embodiment in FIG. 4.

The embodiments of the present invention also provide a multicarrier transmission system for dynamically setting virtual subcarriers. The system differs from the above system in that, the transmitter does not notify the number of the set virtual subcarriers via a signaling after dynamically setting the virtual subcarriers, but the receiver determines the location and the number of the virtual subcarriers through a blind detection after the signal of the transmitter is received. The transmitter and the receiver in the system have specific functions as follows:

The transmitter is configured to acquire dynamic spectrum information of the geographic location where the transmitter is located; and determine the number of left edge virtual subcarriers and the number of right edge virtual subcarriers of the multicarrier transmission system at left and right edges of a working spectrum of the transmitter according to the dynamic spectrum information, to make a sum of the number of the left edge virtual subcarriers and the number of the right edge virtual subcarriers be not less than an aliasing guard band of a baseband signal of the multicarrier transmission system and be not greater than a dimension of discrete Fourier transform of the baseband signal; the transmitter sets the virtual subcarriers of the multicarrier transmission system according to the determined number of the left edge virtual subcarriers and the number of the right edge virtual subcarriers; where the aliasing guard band of the baseband signal is a minimum number of the virtual subcarriers required when a spectrum aliasing of the baseband signal does not exceed a first preset threshold;

The receiver is configured to, determine, after receiving a signal from the transmitter, starting from a first subcarrier at a left edge of a working spectrum of the receiver, contiguous subcarriers with a received signal strength being less than a second preset threshold as a first group of zero subcarriers, and determine, after removing a first guard subcarrier from the first group of zero subcarriers, the first group of zero subcarriers from which the first guard subcarrier has been removed, as the left edge virtual subcarriers; determine, starting from a last subcarrier at a right edge of the working spectrum, contiguous subcarriers with a received signal strength being less than a third preset threshold as a second group of zero subcarriers, and determine, after removing a second guard subcarrier from the second group of zero subcarriers, the second group of zero subcarriers from which the second guard subcarrier has been removed, as the right edge virtual subcarriers; and set the virtual subcarriers of the multicarrier transmission system according to the number of the left edge virtual subcarriers and the number of the right edge virtual subcarriers.

Particularly, for the transmitter, reference can be made to the descriptions of corresponding embodiment in FIG. 2A, FIG. 2B or FIG. 2C, and for the receiver, reference can be made to the descriptions of corresponding embodiment in FIG. 5.

It should be appreciated by persons skilled in the art that, all or a part of the steps in the method of the above embodiments may be completed by a program instructing relevant hardware, and the program may be stored in a computer readable storage medium, when the program is executed, the steps in the method of the above embodiments are performed; the storage medium comprises various medium capable of storing program codes, such as a ROM, a RAM, a magnetic disk, or an optical disk and the like.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from the scope of the embodiments of the present invention.

What is claimed is:

1. A method for dynamically setting virtual subcarriers, applied to a multicarrier transmission system, the method comprising:
　　acquiring, by a transmitter of the multicarrier transmission system, dynamic spectrum information of a geographic location where the transmitter is located;
　　determining, by the transmitter, a number of left edge virtual subcarriers and a number of right edge virtual subcarriers of the multicarrier transmission system at left and right edges of a working spectrum of the transmitter, respectively, according to the dynamic spectrum information, to make a sum of the number of the left edge virtual subcarriers and the number of the right edge virtual subcarriers be not less than an aliasing guard band of a baseband signal of the multicarrier transmission system, and be not greater than a dimension of discrete Fourier transform of the baseband signal; wherein the aliasing guard band of the baseband signal is a minimum number of the virtual subcarriers required when spectrum aliasing of the baseband signal does not exceed a first preset threshold; and
　　setting, by the transmitter, virtual subcarriers of the multicarrier transmission system according to the number of the left edge virtual subcarriers and the number of the right edge virtual subcarriers determined;
　　wherein after determining the number of the left edge virtual subcarriers and the number of the right edge virtual subcarriers of the multicarrier transmission system, the method further comprises:
　　　　sending, by the transmitter, a virtual subcarrier adjustment indication to a receiver of the multicarrier transmission system, wherein the virtual subcarrier adjustment indication comprises the number of the left edge virtual subcarriers, the number of the right edge virtual subcarriers and a virtual subcarrier adjustment time of the multicarrier transmission system, to enable the receiver to set the virtual subcarriers of the multicarrier transmission system according to the left edge virtual subcarriers and right edge virtual subcarriers determined, when the virtual subcarrier adjustment time arrives.

2. The method according to claim 1, wherein determining, by the transmitter, the number of the left edge virtual subcarriers and the number of the right edge virtual subcarriers of the multicarrier transmission system at the left and right edges of the working spectrum of the transmitter according to the dynamic spectrum information, comprises:
　　determining, by the transmitter, within the working spectrum, starting from a first subcarrier at the left edge of the working spectrum of the transmitter, multiple contiguous and unusable subcarriers to form a first subcarrier group, and determining, within the working spectrum, starting from a last subcarrier at the right edge of the working spectrum, multiple contiguous and unusable subcarriers to form a second subcarrier group, according to the dynamic spectrum information; and
　　selecting, starting from the right edge of the first subcarrier group to the right, multiple contiguous subcarriers to form a third subcarrier group, wherein the first subcarrier group and the third subcarrier group together form the left edge virtual subcarriers, and selecting, starting from the left edge of the second subcarrier group to the left, a contiguous fourth subcarrier group, wherein the second subcarrier group and the fourth subcarrier group together form the right edge virtual subcarriers, and the sum of the number of the left edge virtual subcarriers and the number of the right edge virtual subcarriers is not less than an aliasing guard band of the baseband signal, and is not greater than a dimension of discrete Fourier transform of the baseband signal.

3. The method according to claim 1, wherein acquiring, by the transmitter, the dynamic spectrum information of the geographic location where the transmitter is located, comprises:
　　acquiring, by the transmitter, the dynamic spectrum information of the geographic location where the transmitter is located through a built-in spectrum sensing module or by accessing a remote spectrum database.

4. The method according to claim 2, wherein the first subcarrier group and the second subcarrier group respectively are a part of subcarriers corresponding to unusable spectrum locations of the transmitter.

5. A method for receiving dynamic virtual subcarriers, applied to a multicarrier transmission system, the method comprising:
receiving, by a receiver of the multicarrier transmission system, a virtual subcarrier adjustment indication sent by a transmitter of the multicarrier transmission system, wherein the virtual subcarrier adjustment indication comprises a number of left edge virtual subcarriers, a number of right edge virtual subcarriers and a virtual subcarrier adjustment time of the multicarrier transmission system; wherein a sum of the number of the left edge virtual subcarriers and the number of the right edge virtual subcarriers is not less than an aliasing guard band of a baseband signal of the multicarrier transmission system, and is not greater than a dimension of discrete Fourier transform of the baseband signal; and the aliasing guard band of the baseband signal is a minimum number of the virtual subcarriers required when spectrum aliasing of the baseband signal does not exceed a first preset threshold;
determining, by the receiver, starting from a first subcarrier at a left edge of a working spectrum of the receiver, within the working spectrum, contiguous subcarriers a number of which equals the number of the left edge virtual subcarriers as a first group of virtual subcarriers, and selecting, by the receiver, starting from a last subcarrier at a right edge of the working spectrum, within the working spectrum, contiguous subcarriers a number of which equals the number of the right edge virtual subcarriers as a second group of virtual subcarriers; and
setting, by the receiver, at the virtual subcarrier adjustment time, virtual subcarriers of the multicarrier transmission system according to the numbers of the first group of virtual subcarriers and the number of the second group of virtual subcarriers.

6. The method according to claim 5, wherein the dimension of discrete Fourier transform of the baseband signal is a number of signal sampling points included in a single discrete Fourier transform or a single fast Fourier transform, when the baseband signal of the multicarrier transmission system is demodulated.

7. An apparatus for dynamically setting virtual subcarriers, applied to a multicarrier transmission system, the apparatus comprising:
a spectrum acquiring module, configured to acquire dynamic spectrum information of a geographic location where the apparatus for dynamically setting the virtual subcarriers is located;
a virtual subcarrier determining module, configured to determine a number of left edge virtual subcarriers and a number of right edge virtual subcarriers of the multicarrier transmission system at left and right edges of a working spectrum of the apparatus, respectively, for dynamically setting the virtual subcarriers according to the dynamic spectrum information, to make a sum of the number of the left edge virtual subcarriers and the number of the right edge virtual subcarriers be not less than an aliasing guard band of a baseband signal of the multicarrier transmission system, and be not greater than a dimension of discrete Fourier transform of the baseband signal; wherein the aliasing guard band of the baseband signal is a minimum number of the virtual subcarriers required when spectrum aliasing of the baseband signal does not exceed a first preset threshold;
a virtual subcarrier setting module, configured to set, by the transmitter, the virtual subcarriers of the multicarrier transmission system according to the number of the left edge virtual subcarriers and the number of the right edge virtual subcarriers determined; and
an adjustment indication module, configured to send, after determining the number of the left edge virtual subcarriers and the number of the right edge virtual subcarriers of the multicarrier transmission system, a virtual subcarrier adjustment indication to a receiver, wherein the virtual subcarrier adjustment indication comprises the number of the left edge virtual subcarriers, the number of the right edge virtual subcarriers and a virtual subcarrier adjustment time of the multicarrier transmission system, to enable the receiver to set the virtual subcarriers of the multicarrier transmission system according to the left edge virtual subcarriers and the right edge virtual subcarriers determined, when the virtual subcarrier adjustment time arrives.

8. The apparatus according to claim 7, wherein the virtual subcarrier determining module comprises:
a determining unit, configured to determine, within the working spectrum, starting from a first subcarrier at the left edge of the working spectrum, multiple contiguous and unusable subcarriers to form a first subcarrier group, and determine, within the working spectrum, starting from a last subcarrier at the right edge of the working spectrum, multiple contiguous and unusable subcarriers to form a second subcarrier group, according to the dynamic spectrum information; and
a selecting unit, configured to select, starting from the right edge of the first subcarrier group to the right, multiple contiguous subcarriers to form a third subcarrier group, wherein the first subcarrier group and the third subcarrier group together form the left edge virtual subcarriers, and select, starting from the left edge of the second subcarrier group to the left, a contiguous fourth subcarrier group, wherein the second subcarrier group and the fourth subcarrier group together form the right edge virtual subcarriers, wherein the sum of the number of the left edge virtual subcarriers and the number of the right edge virtual subcarriers is not less than the aliasing guard band of the baseband signal, and is not greater than the dimension of discrete Fourier transform of the baseband signal.

9. The apparatus according to claim 7, wherein the spectrum acquiring module is configured to acquire the dynamic spectrum information of the geographic location where the apparatus is located through a built-in spectrum sensing module of the apparatus or by accessing a remote spectrum database.

10. The apparatus according to claim 8, wherein the first subcarrier group and the second subcarrier group respectively are a part of subcarriers corresponding to unusable spectrum locations of the transmitter.

11. An apparatus for receiving dynamic virtual subcarriers, applied to a multicarrier transmission system, the apparatus comprising:
an indication receiving module, configured to receive a virtual subcarrier adjustment indication sent by a transmitter, wherein the virtual subcarrier adjustment indication comprises a number of left edge virtual subcarriers, a number of right edge virtual subcarriers and a virtual subcarrier adjustment time of the multicarrier transmission system; wherein a sum of the number of the left edge virtual subcarriers and the number of the right edge virtual subcarriers is not less than an aliasing guard band of a baseband signal of the multicarrier transmission system, and is not greater than a dimension of discrete Fourier transform of the baseband signal; and the aliasing guard band of the baseband signal is a minimum number of the virtual subcarriers required when spectrum aliasing of the baseband signal does not exceed a first preset threshold;

a determining module, configured to determine, starting from a first subcarrier at a left edge of a working spectrum of the apparatus for receiving the dynamic virtual subcarriers, within the working spectrum, contiguous subcarriers a number of which equals the number of the left edge virtual subcarriers as a first group of virtual subcarriers, and select, by the receiver, starting from a last subcarrier at a right edge of the working spectrum, within the working spectrum, contiguous subcarriers a number of which equals the number of the right edge virtual subcarriers as a second group of virtual subcarriers; and a setting module, configured to set virtual subcarriers of the multicarrier transmission system according to the number of the first group of virtual subcarriers and the number of the second group of virtual subcarriers at the virtual subcarrier adjustment time.

12. The apparatus according to claim 11, wherein the dimension of the discrete Fourier transform of the baseband signal is a number of signal sampling points included in a single discrete Fourier transform or a single fast Fourier transform, when the baseband signal of the multicarrier signal is demodulated in the multicarrier transmission system.

* * * * *